United States Patent
Kang

(10) Patent No.: US 11,318,905 B2
(45) Date of Patent: May 3, 2022

(54) SIDE AIRBAG APPARATUS

(71) Applicants: HYUNDAI MOTOR COMPANY, Seoul (KR); KIA MOTORS CORPORATION, Seoul (KR)

(72) Inventor: Seung Kyu Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/144,399

(22) Filed: Jan. 8, 2021

(65) Prior Publication Data
US 2022/0048459 A1 Feb. 17, 2022

(30) Foreign Application Priority Data

Aug. 12, 2020 (KR) .................. 10-2020-0100968

(51) Int. Cl.
*B60R 21/207* (2006.01)
*B60R 21/2338* (2011.01)

(52) U.S. Cl.
CPC ........ *B60R 21/207* (2013.01); *B60R 21/2338* (2013.01)

(58) Field of Classification Search
CPC .............. B60R 21/207; B60R 21/2338; B60R 2021/23146; B60R 2021/23386
See application file for complete search history.

(56) References Cited

U.S. PATENT DOCUMENTS

| | | | |
|---|---|---|---|
| 5,667,243 A * | 9/1997 | Fisher | B60R 21/207 280/730.2 |
| 5,730,463 A * | 3/1998 | Fisher | B60R 21/207 280/728.1 |
| 6,029,993 A | 2/2000 | Mueller | |
| 6,425,601 B1 * | 7/2002 | Lewis | B60R 21/01 102/531 |
| 6,997,473 B2 * | 2/2006 | Tanase | B60R 21/207 280/730.2 |
| 7,156,418 B2 * | 1/2007 | Sato | B60R 21/23138 280/730.2 |
| 7,600,777 B2 | 10/2009 | Suzuki et al. | |

(Continued)

FOREIGN PATENT DOCUMENTS

JP 2008-201297 A 9/2008
JP 5109517 B2 12/2012
(Continued)

*Primary Examiner* — Jonathan Ng
*Assistant Examiner* — Joselynn Y Sliteris
(74) *Attorney, Agent, or Firm* — Morgan, Lewis & Bockius LLP

(57) ABSTRACT

A side airbag apparatus includes: an airbag cushion having a rear end configured to be secured to a side surface of a seat and a front end configured to move forwards while the airbag cushion is deployed forwards when gas is injected into the airbag cushion; at least one support tether having a first side coupled to a side surface of the seat to be rotatable about a rotating shaft extending in a direction parallel to a side of the seat, and extending in a longitudinal direction; and at least one outer tether having a first end coupled to a second side of the support tether, and a second end extending in the longitudinal direction and coupled to the front end of the airbag cushion.

13 Claims, 8 Drawing Sheets

(56) References Cited

U.S. PATENT DOCUMENTS

| | | | |
|---|---|---|---|
| 8,628,111 B2* | 1/2014 | Sugimoto | B60R 21/233 |
| | | | 280/729 |
| 10,023,146 B2 | 7/2018 | Faruque et al. | |
| 10,328,889 B2* | 6/2019 | Sugie | B60R 21/233 |
| 10,596,993 B2 | 3/2020 | Dry et al. | |
| 10,632,958 B2 | 4/2020 | Dry et al. | |
| 11,066,036 B2* | 7/2021 | Gwon | B60R 21/231 |
| 2019/0161053 A1* | 5/2019 | Gwon | B60N 2/64 |
| 2021/0061211 A1* | 3/2021 | Jung | B60R 21/216 |

FOREIGN PATENT DOCUMENTS

| | | |
|---|---|---|
| JP | 2014-012475 A | 1/2014 |
| KR | 10-2016-0100906 A | 8/2016 |

\* cited by examiner

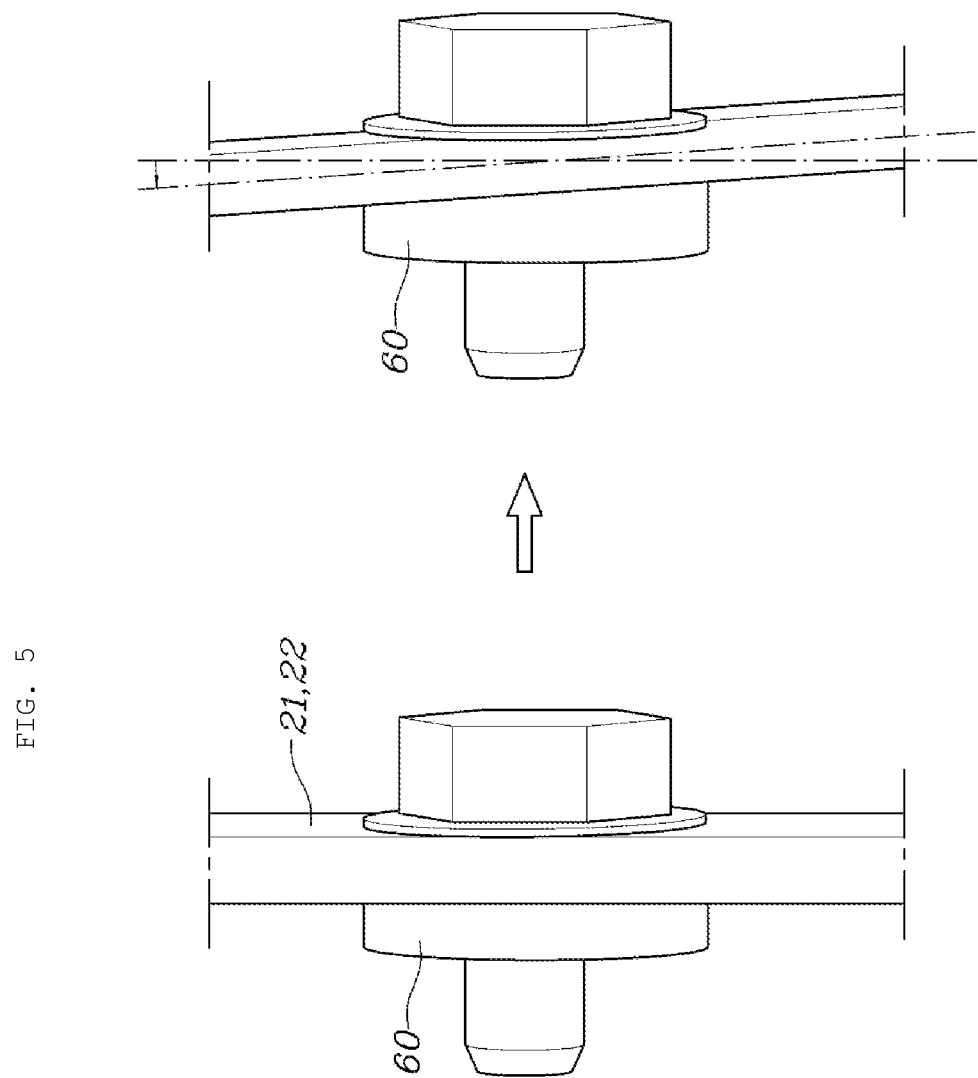

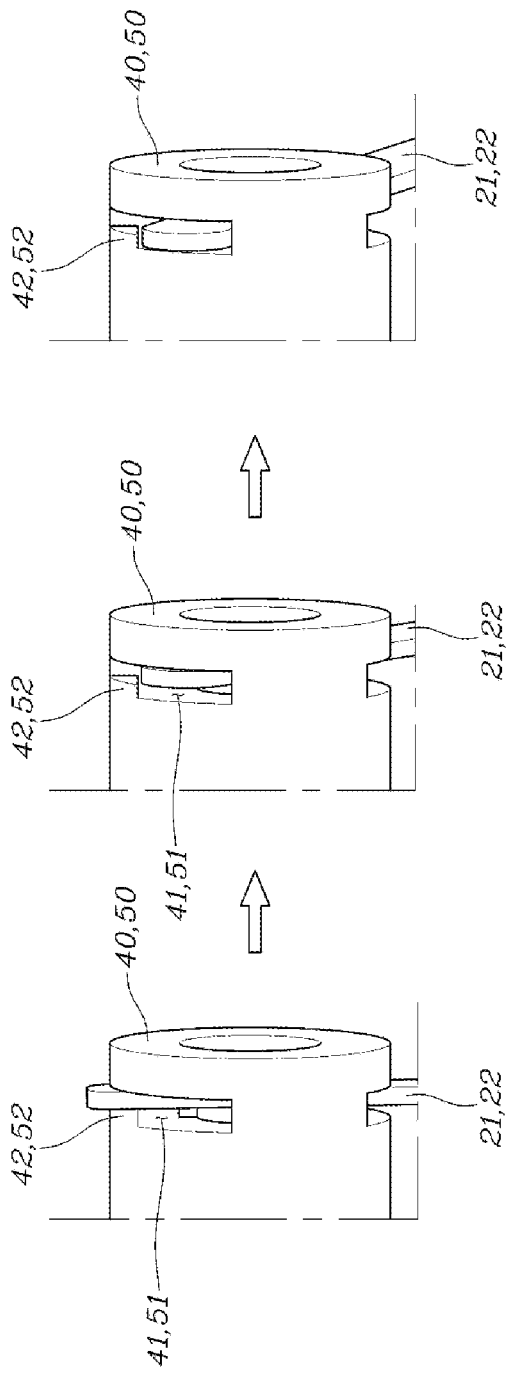

SIDE AIRBAG APPARATUS

CROSS REFERENCE TO RELATED APPLICATION

The present application claims priority to Korean Patent Application No. 10-2020-0100968, filed Aug. 12, 2020 in the Korean Intellectual Property Office, the entire contents of which are incorporated herein for all purposes by this reference.

TECHNICAL FIELD

The present disclosure relates to a side airbag apparatus. More particularly, the present disclosure relates to a side airbag that is mounted on a seat to be deployed from a side of a passenger in the event of a collision.

BACKGROUND

A vehicle is equipped with an airbag so as to protect a passenger in the event of a vehicle collision. The airbag is installed at various positions depending on a body part that is to be protected. Above all, a side airbag is disposed on a side of a passenger, and particularly, a far-side airbag is disposed between a seat and a center console of the vehicle.

The far-side airbag prevents a collision between a driver and a passenger sitting on a passenger seat or prevents a driver from being moved towards the passenger seat as the airbag is deployed in the event of a side collision of a vehicle. In a conventional vehicle, a driver or a passenger is supported by the center console of the vehicle in the event of the side collision, thus preventing the driver or the passenger from being dislodged.

Recently, as the autonomous driving technology of the vehicle is developed, the vehicle may be autonomously driven without a driver's operation. Thus, a passenger seat and a driver's seat are coupled to the vehicle to be slidable or swivelable.

In other words, due to the development of an autonomous vehicle, the positions of a driver and a passenger may be variously applied, so that the supporting force of the side airbag may be undesirably reduced.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and an objective of the present disclosure is to provide an airbag apparatus intended to improve the supporting force of a side airbag that supports a passenger's side in the event of the side collision of a vehicle.

In order to achieve the objective of the present disclosure, the present disclosure provides a side airbag apparatus, including an airbag cushion secured at a rear end thereof to a side surface of a seat, and moved at a front end thereof forwards while the airbag cushion is deployed forwards when gas is injected into the airbag cushion; at least one support tether coupled at a first side thereof to a side surface of the seat to be rotatable about a rotating shaft extending in a direction parallel to a lateral direction of the seat, and extending in a longitudinal direction; and at least one outer tether coupled at a first end thereof to a second side of the support tether, and coupled at a second end thereof extending in the longitudinal direction to the front end of the airbag cushion.

The side airbag apparatus may further include at least one coupling bracket located on a side surface of a seat frame included in the seat, the first side of the support tether may be rotatably coupled to the coupling bracket, with an outer end being formed on the support tether to extend from the first side coupled to the coupling bracket to an outside, and a limit slit may be formed on the coupling bracket to allow the outer end of the support tether moved as the support tether is rotated about the first side to be movable in a predetermine range.

The side airbag apparatus may further include a support extending in a direction of a plane parallel to the side surface of the seat frame, located between the first side of the support tether and the coupling bracket, and damaged or deformed when a pressure exceeding a preset pressure level is applied, and the limit slit may be formed to allow the support tether to be rotated to an outside of the seat in a predetermined range.

The limit slit may be recessed to an inside of the seat in a position where the outer end of the support tether is moved with the support tether being rotated so that the second side of the support tether is moved forwards, thus allowing the outer end of the support tether to be rotated inwards.

The support tether may be made of a material that is relatively higher in rigidity than a material of the outer tether.

The at least one support tether may include a first support tether that extends downwards while a first side thereof is coupled to an upper side of the seat, and a second support tether that extends upwards while a first side thereof is coupled to a lower side of the seat, and the first support tether and the second support tether may be rotated in opposite directions, when the airbag cushion is deployed.

The at least one outer tether may include a first outer tether that is coupled at a first end thereof to the first support tether, and a second outer tether that is coupled at a first end thereof to the second support tether, and the first outer tether may be coupled to an upper side on the front end of the airbag cushion, and the second outer tether may be coupled to a relatively lower side on the front end of the airbag cushion.

The first support tether and the second support tether may be disposed on the side of the seat to be spaced apart from each other.

Upper and lower portions of the airbag cushion may be folded towards a central portion before the airbag cushion is deployed, and the folded airbag cushion may be disposed on the side surface of the seat so that the folded upper and lower portions are located outside the seat as compared with the central portion.

In order to prevent the upper and lower portions folded towards the central portion of the airbag cushion from overlapping each other, an end of each of the upper and lower portions may be disposed on the side surface of the seat while being secondarily folded to the outside of the seat.

A portion of the front end of the airbag cushion may be folded to the outside of the seat, and be temporarily attached in a folded state.

The airbag cushion may be disposed on the side surface of the seat in a rolled state such that the front end of the airbag cushion in the folded state is located at an outer position of the seat as compared with the rear end.

The side airbag apparatus may further include an inflator configured to inject gas into the airbag cushion from the rear end of the airbag cushion.

Before the airbag cushion is deployed, the airbag cushion may be located at an inner position of the seat as compared with the support tether, and be located at an outer position of the seat as compared with the inflator.

A side airbag apparatus according to the present disclosure is advantageous in that a side airbag deployed from a side of a seat is supported so as not to be rotated laterally.

Furthermore, the behavior of a passenger can be stably restrained by supporting a passenger sitting on a seat from a side.

BRIEF DESCRIPTION OF THE DRAWINGS

The above and other objectives, features, and other advantages of the present disclosure will be more clearly understood from the following detailed description when taken in conjoint with the accompanying drawings, in which:

FIGS. 5 and 6 are sequence diagrams illustrating the rotation of the support tether as an airbag cushion is deployed.

DETAILED DESCRIPTION

Figure 1:
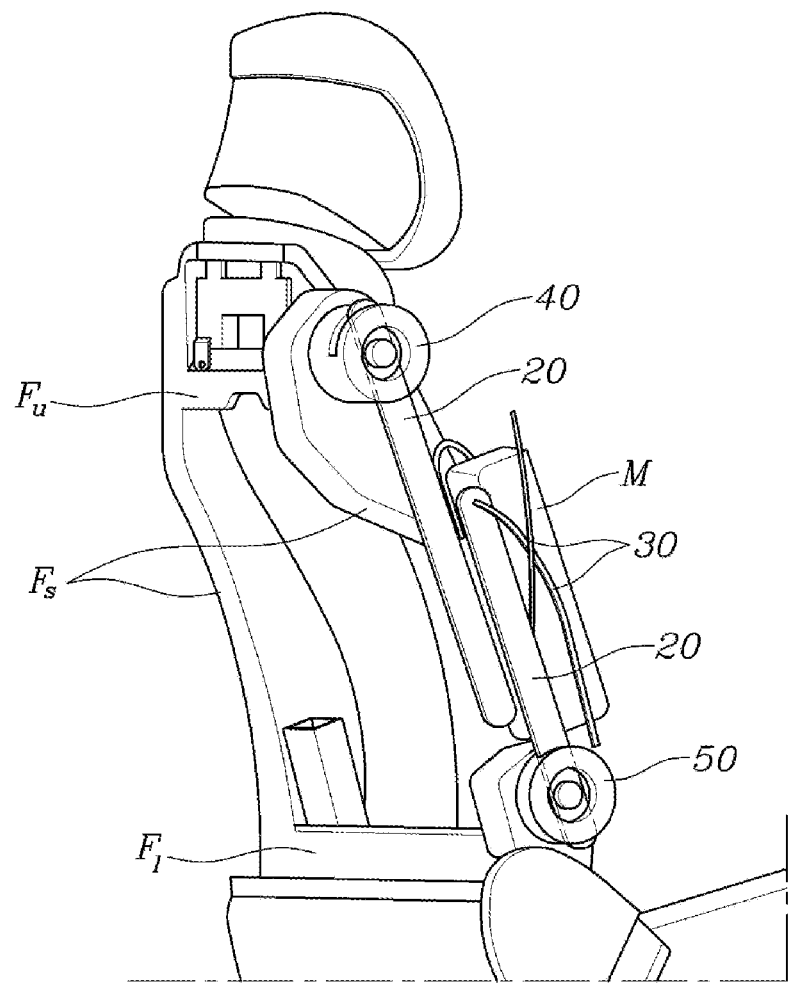
FIG. 1 is a perspective view illustrating a side airbag apparatus in accordance with an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

Since an embodiment of the present disclosure may be changed in various ways and may have various forms, particular embodiments are illustrated in the drawings and will be described in detail in the specification or application. However, it is to be understood that the present description is not intended to limit the present disclosure to particular embodiments, and the present disclosure is intended to cover not only these embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, the present disclosure will be explained in detail by describing exemplary embodiments of the present disclosure with reference to the accompanying drawings. The same reference numerals are used throughout the drawings to designate the same or similar components.

Figure 2:
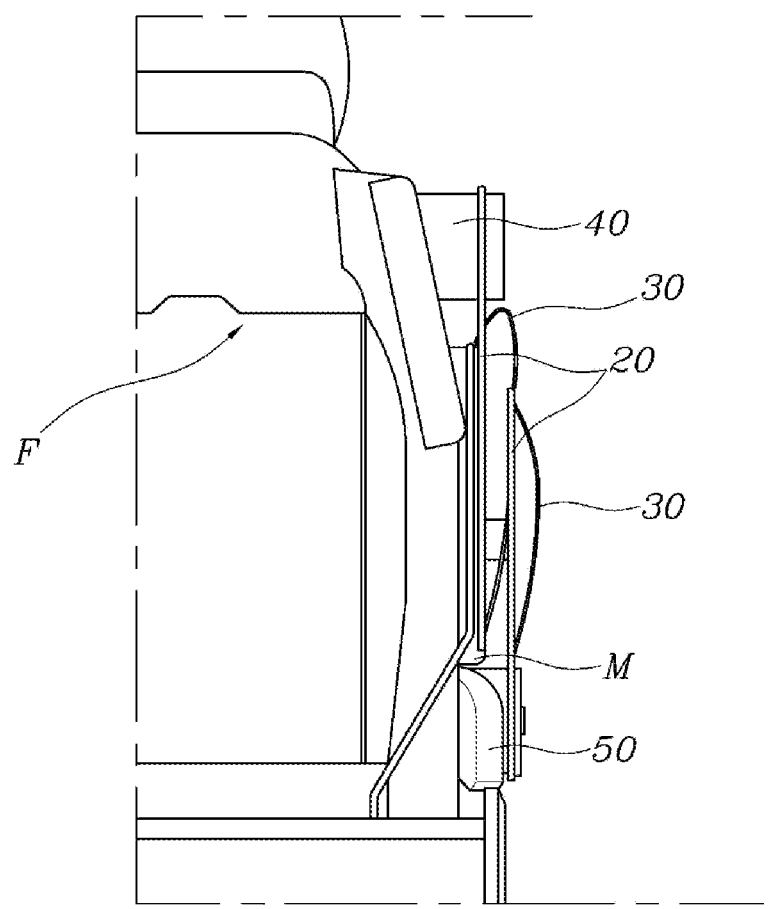
FIG. 2 is a rear view illustrating the side airbag apparatus in accordance with the embodiment of the present disclosure.
Figure 3:
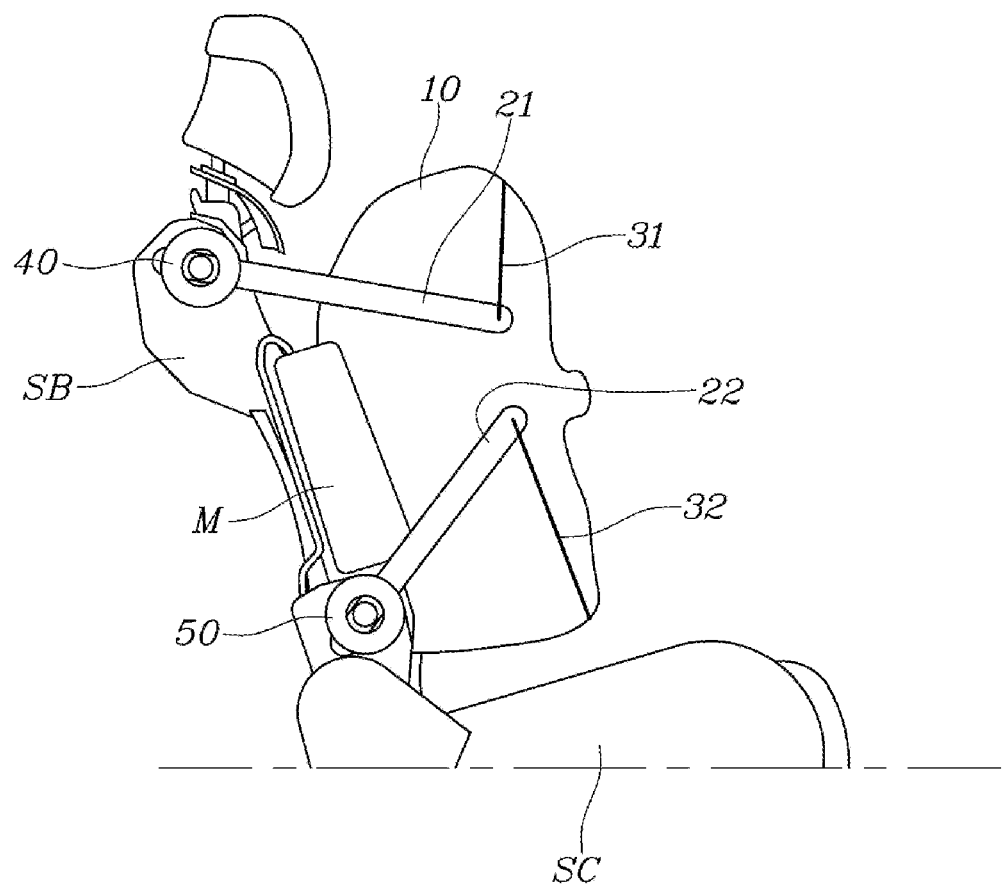
FIG. 3 is a side view illustrating a state in which the side airbag apparatus in accordance with the embodiment of the present disclosure is deployed.

FIG. 1 is a perspective view illustrating a side airbag apparatus in accordance with an embodiment of the present disclosure, FIG. 2 is a rear view illustrating the side airbag apparatus in accordance with the embodiment of the present disclosure, and FIG. 3 is a side view illustrating a state in which the side airbag apparatus in accordance with the embodiment of the present disclosure is deployed.

Referring to FIGS. 1 to 3, the side airbag apparatus in accordance with an embodiment of the present disclosure includes an airbag cushion 10 that is secured at a rear end thereof to a side surface of a seat, and is moved at a front end thereof forwards while the airbag cushion is deployed forwards when gas is injected into the airbag cushion; a support tether 20 that is coupled at a first side thereof to a side surface of the seat to be rotatable about a rotating shaft extending in a direction parallel to a lateral direction of the seat, and extends in a longitudinal direction; and an outer tether 30 that is coupled at a first end thereof to a second side of the support tether 20, and is coupled at a second end thereof extending in the longitudinal direction to the front end of the airbag cushion 10.

As will be described later, the airbag cushion 10 may be formed in a module M in a folded or rolled state to be secured to the seat. Particularly, the airbag cushion 10 may be deployed forwards as gas is injected therein by an inflator 70 that will be described below, in a state where the rear end of the airbag cushion 10 is secured to the seat.

The airbag cushion 10 may be secured to the side of the seat, and particularly be secured to a seatback SB frame that is fixedly coupled to a vehicle boy.

The support tether 20 may be provided on the side surface of the seat to be parallel to the side of the seat. The first side of the support tether may be coupled to be rotatable about the rotating shaft extending to the lateral direction of the seat, so that a second side of the support tether may be moved forwards and backwards.

In particular, the support tether 20 is provided on the side surface of the seat to be located on an outside of the airbag cushion 10. The support tether 20 may support the airbag cushion 10 to prevent the airbag cushion from being moved to the outside when the airbag cushion 10 is deployed.

The first end of the outer tether 30 may be coupled to the second side of the support tether 20, and the second end of the outer tether may be coupled to the front end of the airbag cushion 10. Thus, when the front end is moved forwards by the deployment of the airbag cushion 10, the second side of the support tether 20 may be moved forwards by transmitting the inflation force of the airbag cushion 10.

In other words, when the airbag cushion 10 is deployed, the outer tether 30 may be rotated about a first side thereof and a second side thereof may be moved forwards by the inflation force transmitted through the support tether 20. Thus, the support tether 20 may be provided on the outside of the airbag cushion 10 to support the airbag cushion 10.

Figure 4:
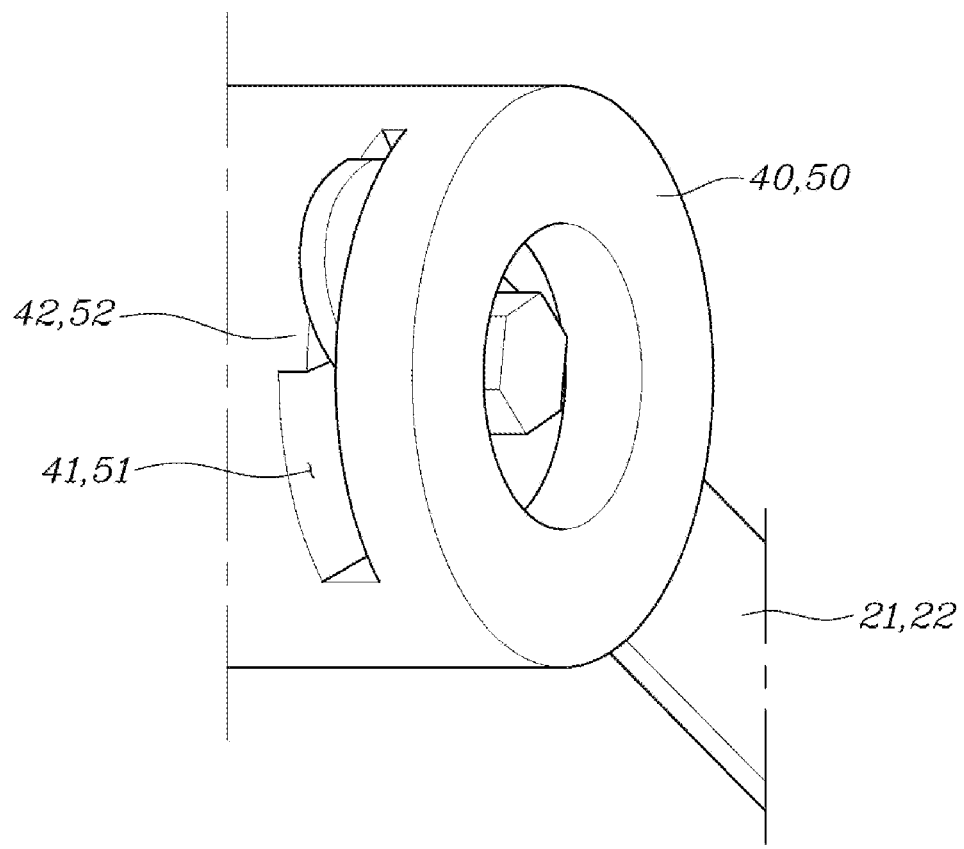
FIG. 4 is a perspective view illustrating the coupling of a coupling bracket and a support tether of the side airbag apparatus in accordance with the embodiment of the present disclosure.
Figure 7A:
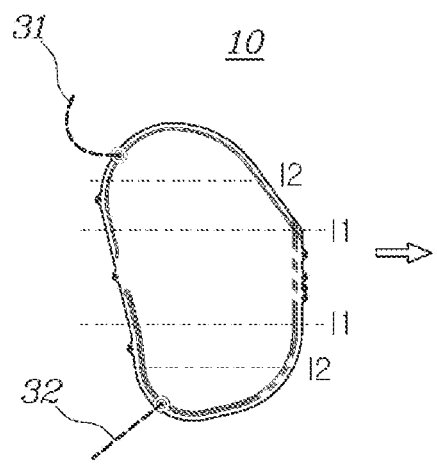
FIGS. 7(a) to 7(d) are sequence diagrams illustrating folding and rolling processes of the airbag cushion included in the side airbag apparatus in accordance with the embodiment of the present disclosure.
Figure 7B:
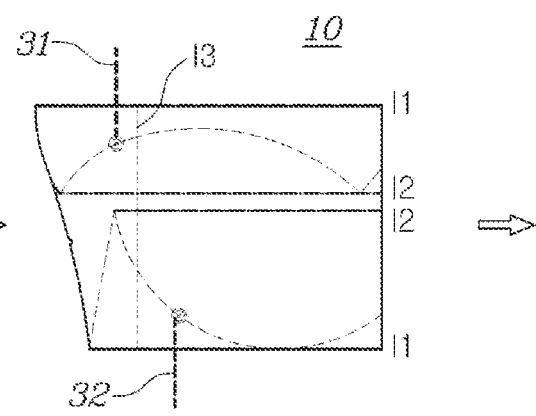
Figure 7C:
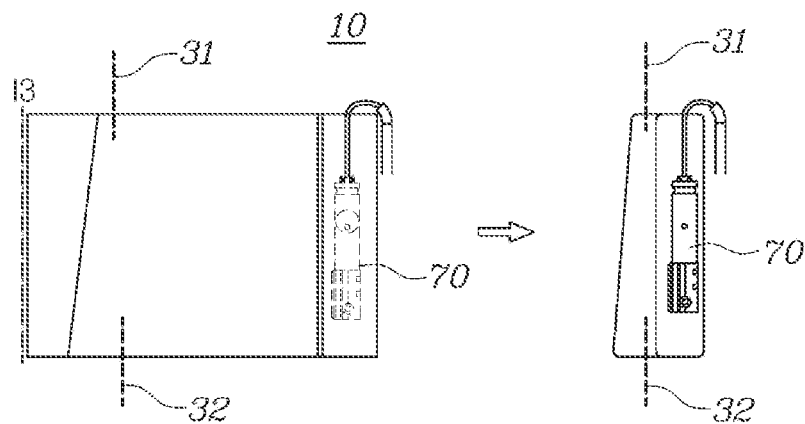
Figure 7D:
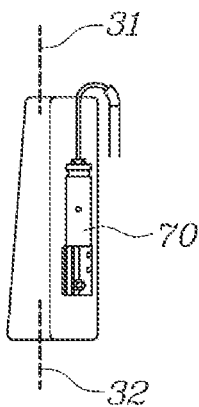

FIG. 4 is a perspective view illustrating the coupling of coupling brackets 40 and 50 and the support tether 20 of the side airbag apparatus in accordance with the embodiment of the present disclosure, and FIGS. 5 and 6 are sequence diagrams illustrating the rotation of the support tether 20 as the airbag cushion 10 is deployed.

Referring to FIGS. 4 to 6, the side airbag apparatus further includes the coupling brackets 40 and 50 located on a side surface of a seat frame included in the seat. The first side of the support tether 20 is rotatably coupled to each of the coupling brackets 40 and 50. An outer end of the support tether 20 extends from the first side coupled to each of the coupling brackets 40 and 50 to the outside. Limit slits 41 and 51 may be formed on the coupling brackets 40 and 50 to allow the outer end of the support tether 20 moved as the support tether 20 is rotated about the first side to be movable in a predetermine range.

The coupling brackets 40 and 50 may be integrally formed on the side surface of the seat frame. To be more specific, the coupling brackets 40 and 50 may be coupled to the seat frame by welding or may be integrally formed on the seat frame by injection molding. Furthermore, the coupling brackets 40 and 50 may be formed on a seat frame F of the seatback SB. The seatback SB may be coupled to a seat cushion SC.

The seat frame F may include an upper frame Fu, a lower frame Fl, and a side frame Fs, and the coupling brackets 40 and 50 may be integrally formed on the side frame Fs.

The first side of the support tether 20 may be rotatably coupled to each of the coupling brackets 40 and 50. In an embodiment, the first side of the support tether 20 may be hinged to each of the coupling brackets 40 and 50. Particularly, the first side of the support tether may be coupled to each coupling bracket by bolting.

The support tether 20 may be coupled to the coupling brackets 40 and 50 to be rotatable about the first side, and may have the outer end extending further outwards than a rotation center. The limit slits 41 and 51 may be formed on the coupling brackets 40 and 50 such that the outer end of the support tether 20 is slidable. The outer end of the support tether 20 may be slidable while being inserted into each of the limit slits 41 and 51.

Furthermore, the limit slits 41 and 51 may be formed to allow sliding in only a preset range, thus preventing the support tether 20 from escaping from the preset range.

The side airbag apparatus may further include a support 60 that extends in a direction of a plane parallel to the side surface of the seat frame, is located between the first side of the support tether 20 and each of the coupling brackets 40 and 50, and is damaged or deformed when a pressure exceeding a preset pressure level is applied. The limit slits 41 and 51 may be formed to allow the support tether 20 to be rotated to the outside of the seat in a predetermined range.

The support 60 may be a washer that extends in a direction of a plane parallel to the coupling brackets 40 and 50, the side surface of the seat frame, or the support tether 20 and is located between the first side of the support tether 20 and each of the coupling brackets 40 and 50. The support 60 may be made of a material such as plastic resin, and may be damaged or deformed when a pressure exceeding a preset pressure level is applied.

When a pressure exceeding a preset pressure level is applied by the support tether 20, the support 60 may be damaged, thus allowing the support tether 20 to be rotated to the outside of the seat. In an embodiment, the support tether 20 may be rotated to the outside of the seat by about 1 to 2 degrees.

Furthermore, the limit slits 41 and 51 may be formed to allow the support tether 20 to be rotated to the outside of the seat in a predetermined range. In particular, the limit slits 41 and 51 may be recessed inwards so that the outer end of the support tether 20 is rotated to the inside as the second side of the support tether 20 is rotated to the outside.

To be more specific, the limit slits 41 and 51 may be recessed to the inside of the seat in a position where the outer end of the support tether 20 is moved with the support tether 20 being rotated so that the second side of the support tether 20 is moved forwards, thus allowing the outer end of the support tether 20 to be rotated inwards.

Protrusions 42 and 52 may be formed on the limit slits 41 and 51 to prevent the support tether 20 from being rotated to the outside before the second side of the support tether 20 is rotated to be moved forwards. Each of the protrusions 42 and 52 may support the outer end of the support tether 20 so that the support tether 20 is not rotated.

In other words, the limit slits 41 and 51 may be formed to allow the outer end of each support tether 20 to be slidable and thereby cause the second side of the support tether 20 to be moved forwards. The protrusions 42 and 52 may be formed to support the outer end of each support tether 20, thus preventing the support tether 20 from being rotated to the outside before the second side of the support tether is moved forwards. The limit slits 41 and 51 may be recessed inwards so that the support tether 20 is rotated to the outside in a predetermined range in a state where the second side of the support tether 20 is moved forwards.

In addition, the protrusions 42 and 52 may be formed on the limit slits 41 and 51 to be stepped, and may lock the support tether so as to prevent the second side of the support tether 20 from being moved rearwards again when the support tether 20 is rotated to the outside in a state where the second side of the support tether 20 is moved forwards.

The support tether 20 may be made of a material that is relatively higher in rigidity than a material of the outer tether 30.

The support tether 20 may have a supporting force that supports the airbag cushion 10 so as to prevent the deployed airbag cushion 10 from being rotated. The outer tether 30 may be made of a fabric material as in the airbag cushion 10. This material may be a flexible material to permit folding or rolling.

In an embodiment, the support tether 20 may be made of a metal material such as high strength steel or a composite resin material such as carbon fiber reinforced polymer (CFRP) or the like. The outer tether 30 may be made of a fabric material such as PA66 or Polyethylene terephthalate (PET).

The outer tether 30 may rotate the support tether 20 by forwardly moving the second side of the support tether 20 coupled to the first end as the second end coupled to the front end of the airbag cushion 10 is moved forwards.

The support tether 20 may include a first support tether 21 that extends downwards while a first side thereof is coupled to an upper side of the seat, and a second support tether 22 that extends upwards while a first side thereof is coupled to a lower side of the seat. When the airbag cushion 10 is deployed, the first support tether 21 and the second support tether 22 may be rotated in opposite directions.

The first support tether 21 may be rotatably coupled to the upper side of the seat, and the second support tether 22 may be rotatably coupled to the lower side of the seat. As the second side of each of the first and second support tethers moves forwards, the first sides of the first and second support tethers may be rotated in opposite directions.

In an embodiment, as the first support tether 21 is rotated counterclockwise and the second support tether 22 is rotate clockwise, the second side may be moved forwards.

The outer tether 30 may include a first outer tether 31 that is coupled at a first end thereof to the first support tether 21, and a second outer tether 32 that is coupled at a first end thereof to the second support tether 22. The first outer tether 31 may be coupled to an upper side on the front end of the airbag cushion 10, and the second outer tether 32 may be coupled to a relatively lower side on the front end of the airbag cushion 10.

The first support tether 21 and the second support tether 22 may be disposed on the side of the seat to be spaced apart from each other.

In an embodiment, the first support tether 21 and the second support tether 22 may extend on planes that are spaced apart from each other on the side of the seat. Thus, even if each of the first support tether 21 and the second support tether 22 is rotated about the first side, the first and second support tethers 21, 22 may not overlap each other.

Figure 8:
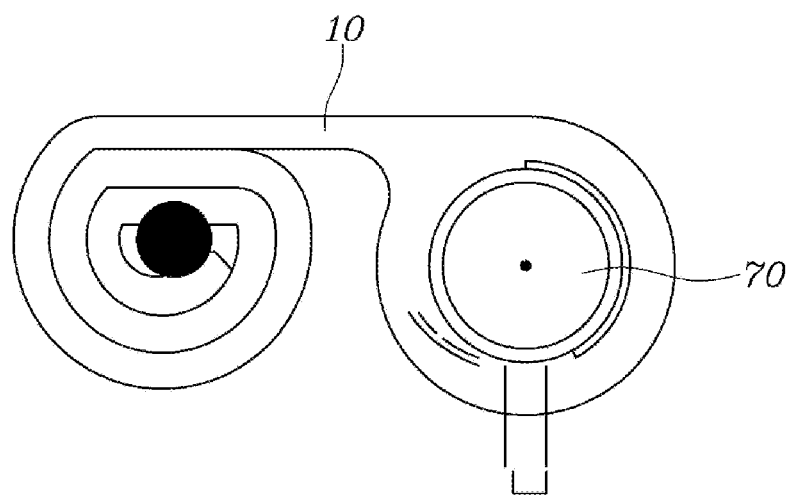
FIG. 8 is a top view illustrating the folded and rolled state of the side airbag apparatus in accordance with the embodiment of the present disclosure.

FIGS. 7(a) to 7(d) are sequence diagrams illustrating folding and rolling processes of the airbag cushion 10 included in the side airbag apparatus in accordance with the embodiment of the present disclosure, and FIG. 8 is a top view illustrating the folded and rolled state of the side airbag apparatus in accordance with the embodiment of the present disclosure.

Referring to FIGS. 7(a) to 7(d) and FIG. 8, upper and lower portions of the airbag cushion 10 may be folded 11 towards a central portion before the airbag cushion is deployed, and the folded airbag cushion may be disposed on the side surface of the seat so that the folded upper and lower portions are located outside the seat as compared with the central portion.

Before the airbag cushion 10 is deployed, the airbag cushion may be disposed on the side surface of the seat with the airbag cushion being folded and rolled. In particular, the upper and lower portions of the airbag cushion 10 may be folded towards the central portion. In particular, the upper portion of the airbag cushion 10 may be folded downwards, and the lower portion of the airbag cushion 10 may be folded upwards.

The upper portion of the airbag cushion 10 may be folded 11 to be located at an outer position as compared with the central portion. The lower portion of the airbag cushion 10 may be folded 11 to be located at an outer position as compared with the central portion.

In order to prevent the upper and lower portions folded towards the central portion of the airbag cushion 10 from overlapping each other, each end of the upper and lower portions may be disposed on the side surface of the seat while being secondarily folded 12 to the outside of the seat.

The upper portion of the airbag cushion 10 may be primarily folded 11 downwards and then be secondarily folded 12 upwards again. The lower portion of the airbag cushion 10 may be primarily folded 11 upwards and then be secondarily folded 12 downwards again. In particular, the upper and lower portions of the airbag cushion 10 may be primarily and secondarily folded to the outside.

A portion of the front end of the airbag cushion 10 may be folded to the outside of the seat, and be temporarily attached in the folded state.

The front end of the airbag cushion 10 may be folded rearwards, and be folded 13 to the outside of the seat. In an embodiment, the airbag cushion 10 may be folded in a rectangular shape, and the front end of the airbag cushion in the folded state may be folded 13 to extend in a vertical direction or in a direction parallel to the extending direction of the seatback SB.

In an embodiment, the airbag cushion 10 may be folded 13 such that a position on the front end of the airbag cushion 10 to which each of the first outer tether 31 and the second outer tether 32 is coupled is in the vertical direction or in the direction parallel to the extending direction of the seatback SB.

The airbag cushion 10 may be disposed M on the side surface of the seat in a rolled state such that the front end of the airbag cushion in the folded state is located at an outer position of the seat as compared with the rear end.

The airbag cushion 10 may be secondarily folded in the vertical direction, and be rolled such that the front end is located at an outer position of the seat in a state where the front end is folded rearwards.

The side airbag apparatus may further include an inflator 70 that is configured to inject gas into the airbag cushion 10 from the rear end of the airbag cushion 10. The inflator 70 may generate gas in response to a collision signal of the vehicle, and may supply the generated gas into the airbag cushion 10.

Furthermore, before the airbag cushion is deployed, the airbag cushion 10 may be located at an inner position of the seat as compared with the support tether 20, and be located at an outer position of the seat as compared with the inflator 70.

Thus, the airbag cushion 10 supplied with gas from the inflator 70 may be located at an outer position as compared with the inflator 70, and be deployed to the outside at the outside of the inflator 70. Thus, the airbag cushion 10 is advantageous in that it can be deployed without being interfered with by a passenger sitting on the seat.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A side airbag apparatus of a seat, comprising:
an airbag cushion having:
a rear end configured to be secured to a side surface of the seat;
a front end configured to move forwards while the airbag cushion is deployed forwards when gas is injected into the airbag cushion;
at least one support tether having a first side rotatably coupled to the side surface of the seat about a rotating shaft that extends in a direction parallel to a lateral direction of the seat, the at least one support tether extending in a longitudinal direction; and
at least one outer tether having:
a first end coupled to a second side of the at least one support tether, and
a second end extending in the longitudinal direction and coupled to the front end of the airbag cushion,
wherein the at least one support tether comprises:
a first support tether that extends downwards while a first side of the first support tether is coupled to an upper side of the seat; and
a second support tether that extends upwards while a first side of the second support tether is coupled to a lower side of the seat, and
wherein, when the airbag cushion is deployed, the first support tether and the second support tether are configured to rotate in opposite directions to each other.

2. The side airbag apparatus of claim 1, further comprising at least one coupling bracket located on a side surface of a seat frame that is disposed in the seat,
wherein the first side of the at least one support tether is rotatably coupled to the coupling bracket,
wherein an outer end of the at least one support tether is configured to extend from the first side of the at least one support tether to an outside, and
wherein the coupling bracket includes a limit slit configured to allow the outer end of the at least one support tether to rotatably move as the at least one support tether rotates about the first side in a predetermine range.

3. The side airbag apparatus of claim 2, further comprising a support extending in a direction of a plane parallel to the side surface of the seat frame, disposed between the first side of the at least one support tether and the coupling bracket, and configured to be deformed when a pressure exceeding a preset pressure level is applied,
wherein the limit slit is configured to allow the at least one support tether to rotate toward an outside of the seat in a predetermined range.

4. The side airbag apparatus of claim 2, wherein the limit slit is recessed toward an inside of the seat, and
wherein the first side of the at least one support tether is configured to rotatably move with the outer end of the at least one support tether, the second side of the at least one support tether is configured to be rotatably moved forwards, and the outer end of the at least one support tether is configured to be rotated inwards.

5. The side airbag apparatus of claim 1, wherein the at least one support tether includes a material having a rigidity higher than that of a material of the outer tether.

6. The side airbag apparatus of claim 1, wherein the at least one outer tether comprises:
a first outer tether having a first end coupled to the first support tether; and
a second outer tether having a first end coupled to the second support tether, and wherein the first outer tether is coupled to an upper side on the front end of the airbag cushion, and the second outer tether is coupled to a lower side on the front end of the airbag cushion.

7. The side airbag apparatus of claim 1, wherein the first support tether and the second support tether are spaced apart from each other on the side surface of the seat.

8. The side airbag apparatus of claim 1, wherein upper and lower portions of the airbag cushion are configured to be folded towards a central portion before the airbag cushion is deployed, and
wherein the folded airbag cushion is disposed on the side surface of the seat and the folded upper and lower portions extend farther outside the seat than the central portion.

9. The side airbag apparatus of claim 8, wherein, an end of each of the upper and lower portions is disposed on the side surface of the seat while being secondarily folded to the outside of the seat, such that the upper and lower portions folded towards the central portion of the airbag cushion are separated from each other.

10. The side airbag apparatus of claim 8, wherein a portion of the front end of the airbag cushion is configured to be folded to the outside of the seat to be temporarily attached in a folded state.

11. The side airbag apparatus of claim 8, wherein the airbag cushion is disposed on the side surface of the seat in a rolled state such that the front end of the airbag cushion in the folded state extends farther out than the rear end.

12. The side airbag apparatus of claim 1, further comprising an inflator configured to inject gas into the airbag cushion from the rear end of the airbag cushion.

13. The side airbag apparatus of claim 12, wherein, before the airbag cushion is deployed, the airbag cushion is disposed at an inner position of the seat as compared with the support tether, and is disposed at an outer position of the seat as compared with the inflator.

* * * * *